United States Patent
Harting et al.

(10) Patent No.: US 6,269,917 B1
(45) Date of Patent: Aug. 7, 2001

(54) ELECTROMAGNETICALLY ACTUATED BRAKE

(75) Inventors: Dietmar Harting, Espelkamp; Wilhelm Niermann, Stemwede; Wolfgang Neuhaus, Bad Oeynhausen, all of (DE)

(73) Assignee: Harting KGaA (DE)

( * ) Notice: Subject to any disclaimer, the term of this patent is extended or adjusted under 35 U.S.C. 154(b) by 0 days.

(21) Appl. No.: 09/434,266

(22) Filed: Nov. 5, 1999

(51) Int. Cl.[7] ................................................. F16D 59/02
(52) U.S. Cl. ........................... 188/161; 188/171; 188/69; 192/90
(58) Field of Search ...................... 158/171, 161, 158/163, 68, 69; 192/90, 84.92

(56) References Cited

U.S. PATENT DOCUMENTS

| | | | |
|---|---|---|---|
| 895,152 | * 8/1908 | Bornefeld | 192/69.81 |
| 2,969,134 | 1/1961 | Wiedmann et al. . | |
| 3,096,863 | * 7/1963 | Shefke | 192/90 |
| 3,190,414 | 6/1965 | Maurer et al. . | |
| 3,327,823 | * 6/1967 | Miller | 192/84 |
| 3,331,481 | * 7/1967 | Wrensch | 192/90 |
| 3,400,797 | * 9/1968 | Horn et al. | 192/84 |
| 3,741,353 | 6/1973 | McKinley et al. . | |
| 4,010,832 | 3/1977 | Puro . | |
| 4,744,449 | * 5/1988 | Sekulla et al. | 192/84 C |
| 5,080,214 | * 1/1992 | Fossum | 192/84 R |

FOREIGN PATENT DOCUMENTS

| | | |
|---|---|---|
| 28 44 925 A1 | 10/1979 | (DE) . |
| 1068637 | * 5/1967 | (GB) . |
| 1 602 627 | 11/1981 | (GB) . |

OTHER PUBLICATIONS

Harrison, C. Norman, "Mechanical Clutches", Machine Design, Jun. 17, 1965, pp. 42–52, Morse Chain Co., Ithaca N.Y.

* cited by examiner

Primary Examiner—Robert J. Oberleitner
Assistant Examiner—Bradley King
(74) Attorney, Agent, or Firm—Cook, Alex, McFarron, Manzo, Cummings & Mehler, Ltd.

(57) ABSTRACT

For an electromagnetically actuated brake, in particular a stopping brake, having a high stopping moment and short braking paths and consisting of a cam disc (3) which is guided in a torsion-proof manner, a spring (4) which presses the cam disc axially into the locking position, and an electromagnet (5, 6, 7) which unlocks the cam disc against the spring (4), it is proposed that the axially movable cam disc (3) be of ferromagnetic construction and that a number of cams (31) be provided which engage, in a form-locking manner, in the recesses (11) in the rotatable part (1) to be braked, the cams (31) and recesses having flanks standing perpendicularly to the direction of rotation and the spring being constructed as a leaf spring (4) with three bending arms which act upon the face of the cam disc (3) at an equal distance from one another.

3 Claims, 2 Drawing Sheets

ELECTROMAGNETICALLY ACTUATED BRAKE

The invention relates to an electromagnetically actuated brake, in particular a stopping brake, having a high stopping moment and short braking paths and consisting of a cam disc which is guided in a torsion-proof manner, a spring which presses the said cam disc axially into the locking position, and an electromagnet which unlocks the said cam disc against the spring.

The intention, in this case, is to construct the electromagnetically actuated brake for small, revolving rotatable parts which are halted directly at the end of a working phase with little after-running and are stopped with very high torque by form-locking. The said brake is likewise intended to be suitable for retardation and stopping in the event of a power failure.

It is known practice to employ, for this purpose, spring-type or shoe-type brakes which are lifted clear with the aid of electromechanical means against a spring in order to release rotary movement. In the case of clutches, force-locking and, in some cases, form-locking transmission elements are employed in order to make the transmissible torque—in the case of brakes, the braking or stopping moment—as high as possible. In clutches and brakes, high transmission moments or torques necessitate correspondingly high normal forces towards the toothed transmission elements or brake linings. In the course of uncoupling or unlocking, however, the said forces have to be generated with corresponding energy with the aid of, for example, electromechanical means. This results, when there is a requirement for low slip or short braking paths and for high transmission moments or stopping moments, in a comparatively large, expensive and high-powered construction.

The underlying object of the invention is to construct an electromagnetic brake of the initially mentioned type for drive problems in the lower output range, which range is to be associated more with precision mechanics, to the effect that an inexpensive construction, in particular a flat structural shape, is achieved, under which circumstances, on the one hand the brake is in a favourable relationship, energy-wise, to the appertaining drive, but on the other hand short braking paths and high stopping moments are brought about.

This object is achieved through the fact that the axially movable cam disc is ferromagnetic and has a number of cams which engage, in a form-locking manner, in the recesses in the rotatable part to be braked, that the cams and recesses have flanks standing perpendicularly to the direction of rotation, and that the spring is constructed as a leaf spring with three bending arms which act upon the face of the cam disc at an equal distance from one another.

Under these circumstances, a form-locking connection between the brake and the rotatable part is produced during the braking and stopping operation, the energy of the revolving rotatable part being converted into an elastic impingement of the parts forming the form-locking connection. This arrangement can therefore be extended only up to rotational speeds and moments of inertia such that the braking energy to be applied in the process can be absorbed in a sustained manner in the materials involved without irreversible deformations. For the braking operation, the form-locking connection is produced between a disc which is provided with cams, is axially guided in a torsion-proof manner and is axially actuated by a circular, flat leaf spring, and the revolving rotatable part to be braked, which has lateral recesses for the form-locking connection with the cams. The circular leaf spring acts upon three points for the purpose of axially displacing the rotation-proofed, axially guided cam disc, and thereby guarantees an even axial movement; because of the stable support, the said leaf spring is therefore not inclined to tilt—an important prerequisite for the most even engagement possible in the revolving counter-piece to be braked. Because of the form-locking principle, with active faces on the cams and appertaining recesses that are constructed perpendicularly to the direction of rotation, the force of the leaf spring has no effect on braking and stopping moments. During the braking operation, no component acts against the spring in the axial direction. The said spring can thereby be relatively weak and be designed, in its axial extent, as a very flat leaf spring. Likewise, for the purpose of unlocking the brake, a relatively weak electromagnet with plane poles is now sufficient for pulling back the ferromagnetic cam disc in the axial direction against the action of the leaf spring. Again in connection with the large pole faces of the ferromagnetic housing of the electromagnet, the axial extent of the said housing can likewise be kept small, even though the traction and stopping forces are adequate.

Advantageous refinements of the invention are indicated in claims 2 to 8.

Summed up, the advantages achieved with the aid of the invention consist in the fact that a spring of weak dimensions and an electromagnet of weak power can be employed for the drastic braking and stopping action achieved by form-locking, and that it is thereby possible to achieve a very flat structural shape of the two components, with few additional parts. The construction of the brake is therefore simple, robust, reliable and inexpensive.

An advantageous refinement of the invention is possible as a result of the size and shape of the recesses in the rotatable part which receive the cams. Bevels recessed in accordance with the direction of rotation make the dropping-in of the cams more reliable.

The shaft, or an additional bush in which the shaft runs, made of ferromagnetic material reduces the air gap and thus increases the force of the electromagnet against the leaf spring during unlocking. The bush can also be constructed as an axially polarised permanent magnet, as a result of which the electromagnet, together with the leaf spring, represents a polarised system which can be operated pulse-wise, that is to say in a very energy-saving manner, and, for the purpose of effecting locking as a safety function, does not drop away in the current-less condition. In the first instance, the current can be reduced during stopping because of the high force effect of the electromagnet in the closed condition. This can also advantageously take place as a result of a divided winding with tapping, which is only partially operated during stopping. In order to be able to incorporate a leaf spring when the diameter of the arrangement is small compared with the stroke of the cam disc, the said leaf spring should advantageously have preferably three long, tangentially constructed bending arms. The load distribution during the braking operation improves, and the braking path or braking angle shortens, with the number of cams. The stationary guide for the cams, which perform an axial lifting movement, may at the same time carry, as a coil body, the winding of the electromagnet. The cams, which are attached by injection moulding, and the coil body with the guide slots are preferably constructed in a combination of plastics which can be subjected to high stresses and has good elastic properties.

An exemplified embodiment of the invention is represented in the drawings and will be described in greater detail below. In the drawings.

Figure 1:
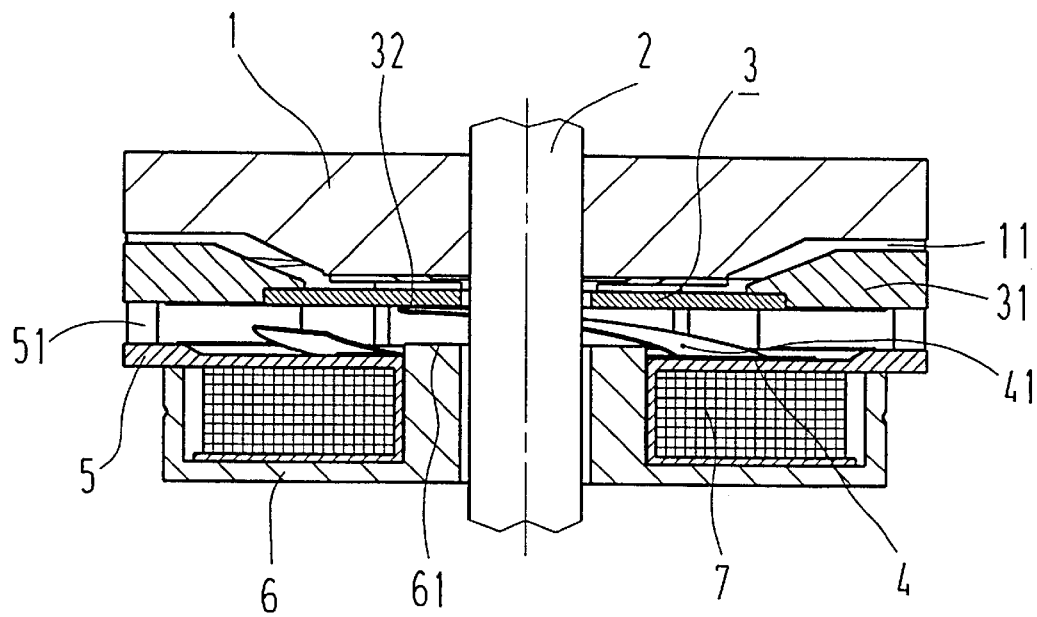
FIG. 1 shows a sectional view of the brake.
Figure 2:
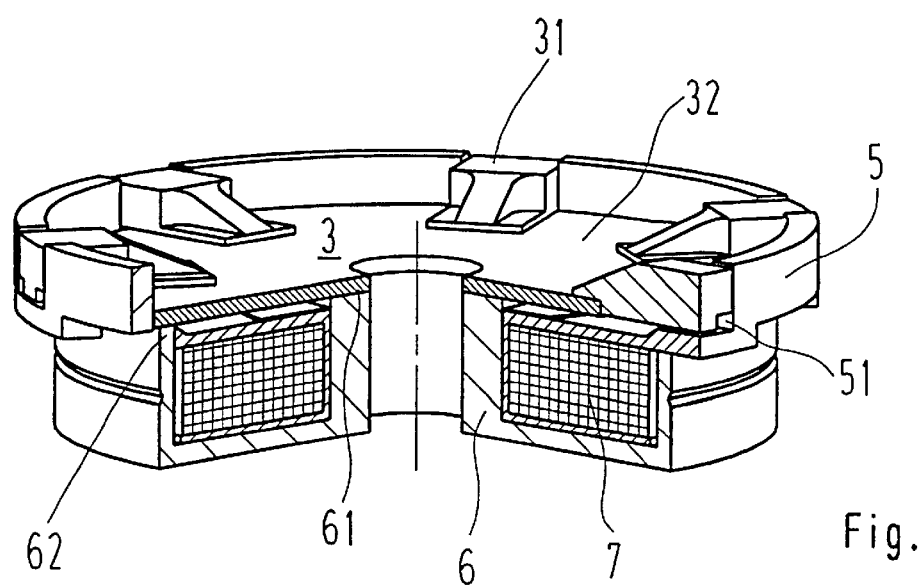
FIG. 2 shows a sectional representation, in perspective, of the brake illustrated in FIG. 1, without the revolving part which is to be braked.
Figure 3:
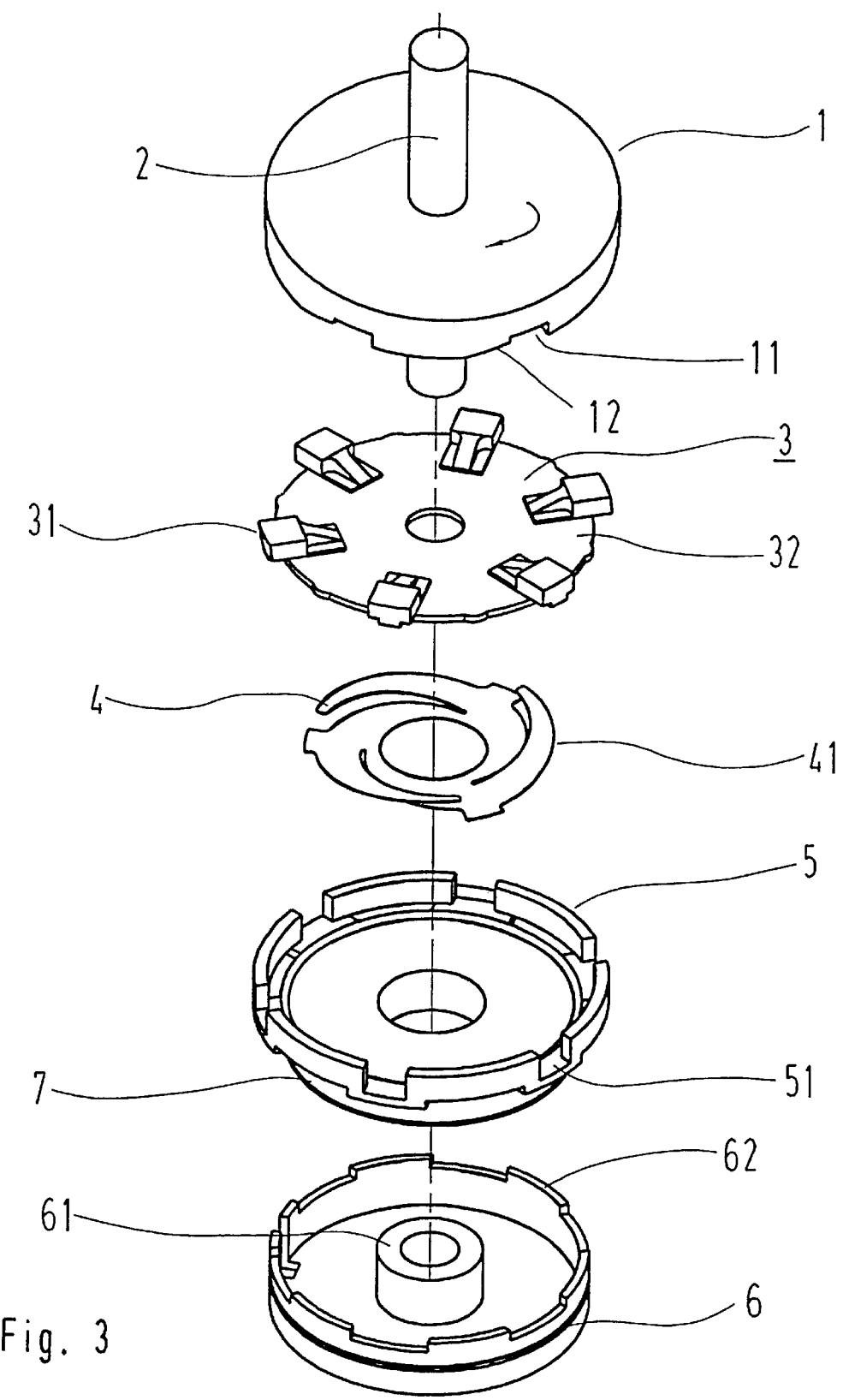
FIG. 3 shows an exploded representation of the brake illustrated in FIG. 1.

Represented in FIGS. 1 to 3 on a shaft 2, is a cylindrical, rotatable part 1 which can be constructed as a driving gearwheel and into which recesses 11 for the engagement of cams 31 are incorporated. On the side that faces towards the brake, the said recesses 11 are distributed at the same distance from one another as the appertaining cams 31 on the cam disc 3. In the representation, the said cam disc 3 and the rotatable part 1 are in engagement, since the leaf spring 4 presses the cam disc 3, which is axially movable on the shaft 2, into the recesses 11 with the aid of its three bending arms 41. Since the cams 31 are further guided in the guide slots 51 in the stationary coil body 5, which is inserted in the housing 6, the rotatable part 1 is arrested.

Accommodated in the coil body 5 is an electrical winding 7 which, when supplied with current, generates a magnetic field in the housing 6 made of ferromagnetic material, which field exerts a force effect on the ferromagnetic plate 32 of the cam disc 3 via the inner pole face 61 and the outer pole face 62.

The said force is directed oppositely to the force of the leaf spring 4 and pulls the cam disc 3 in the axial direction, out of engagement with the rotatable part 1. The brake is unlocked. The cam disc 3 now adheres by its ferromagnetic plate 32 to the inner and outer poles 61 and 62 of the housing 6, which are represented in FIG. 2.

When the drive of the shaft 2 is switched off or the current supply fails, the electromagnet formed by the winding 7, the housing 6 and the coil body 5 is likewise switched off. The force of the spring 4 now moves the cam disc 3 on the shaft 2 and in the guide slots 51 with guidance in the axial direction, the spring 4 acting upon the cam disc 3 at three points with the aid of three bending arms 41 and thereby guaranteeing a stable longitudinal movement. As represented in FIG. 3, the bending arms 41 can be of long design because of their tangential arrangement, and thereby permit a flat structural shape for the spring 4.

Conveyed by the bevels 12 in the rotatable part 1, which are represented in FIG. 3, the cams 31, which are still guided in their guide slots 51, will drop into the recesses 11 and bring the revolving rotatable part 1 to a standstill in a short time by elastic impingements of the cams 31 against the flanks of the recesses 11 and of the guide slots 51.

For this reason, the cams 31 and the coil body 5 are designed in a combination of plastics which is capable of being subjected to high loads. This is also advantageous for the region of the recesses 11 in the rotatable part. These material properties and the mass moment of inertia to be braked determine the admissible rotational speed for which the brake can be reliably employed. As a result of the form-locking connection, high stopping forces and, if the rotational speeds are not too high, a maximum braking angle of almost 60° are achieved in the case of six cams 31. However, the said angle can be further diminished at will by means of a larger number of cams 31, in which case the switching time of the electromagnet 5, 6, 7 must not be disregarded.

What is claimed is:

1. An electromagnetically actuated brake, having a high stopping moment and short braking paths and consisting of a cam disc (3) which is guided in a torsion-proof manner, a spring (4) which presses the cam disc axially into the locking position, and an electromagnet (5, 6, 7) which unlocks the cam disc against the spring (4), characterized in that the axially movable cam disc (3) is ferromagnetic and has a number of cams (31) which engage, in a form-locking manner, in the recesses (11) in the rotatable part (1) to be braked, that the cams (31) and recesses have flanks standing perpendicularly to the direction of rotation, and that the spring is constructed as a leaf spring (4) with three bending arms which act upon the face of the cam disc (3) at an equal distance from one another, characterized in that the electromagnet (5, 6, 7) includes a stationary coil body (5) which includes guide slots (51) for the cam disc (3), the stationary coil body (5) performs an axial lifting movement, and at the same time, carries an electric winding of the electromagnet, further characterized in that the cams (31) are injection-molded onto a ferromagnetic plate (32) as plastic parts, and the cams and the stationary coil body (5) with the guide slots (51 ) consist of a combination of plastics which can be subjected to high stresses and has good elastic properties.

2. The electromagnetically actuated brake according to claim 1 characterized in that the recesses (11) in the rotatable part (1) which receive the cams (31) have bevels (12) recessed in accordance with the direction of rotation and thereby make the dropping-in of the cams (31) more reliable.

3. The electromagnetically actuated brake according to claim 1 characterized in that the leaf spring (4) has three long, tangentially constructed bending arms.

* * * * *